(12) United States Patent
Bengtsson et al.

(10) Patent No.: US 9,973,928 B2
(45) Date of Patent: May 15, 2018

(54) AUTHENTICATION WITH ULTRASOUND

(71) Applicant: Sony Corporation, Tokyo (JP)

(72) Inventors: Henrik Bengtsson, Lund (SE); Peter Isberg, Lund (SE); Per Åstrand, Lund (SE); Olivier Moliner, Lund (SE); Peter Karlsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 19 days.

(21) Appl. No.: 14/443,128

(22) PCT Filed: Nov. 20, 2014

(86) PCT No.: PCT/EP2014/075121
§ 371 (c)(1),
(2) Date: May 15, 2015

(87) PCT Pub. No.: WO2015/149882
PCT Pub. Date: Oct. 8, 2015

(65) Prior Publication Data
US 2016/0277925 A1    Sep. 22, 2016

Related U.S. Application Data

(63) Continuation of application No. 61/973,299, filed on Apr. 1, 2014.

(51) Int. Cl.
*H04W 12/06* (2009.01)
*G06F 21/31* (2013.01)
(Continued)

(52) U.S. Cl.
CPC ............ *H04W 12/06* (2013.01); *G06F 21/31* (2013.01); *G06F 21/35* (2013.01); *H04B 11/00* (2013.01);
(Continued)

(58) Field of Classification Search
CPC ........ G06F 21/35; G06F 21/31; H04W 12/06; H04L 63/08; H04L 63/0853; H04L 63/083; H04L 63/107
See application file for complete search history.

(56) References Cited

U.S. PATENT DOCUMENTS

| 6,658,250 B1 * | 12/2003 | Ganesan | ................ H04W 88/02 340/7.1 |
| 9,268,920 B1 * | 2/2016 | Butler | ...................... G06F 21/10 |

(Continued)

OTHER PUBLICATIONS

S. Choi and D. Zage, "Addressing insider threat using "where you are" as fourth factor authentication," 2012 IEEE International Carnahan Conference on Security Technology (ICCST), Boston, MA, 2012, pp. 147-153.*

(Continued)

*Primary Examiner* — Kari Schmidt
(74) *Attorney, Agent, or Firm* — James C. Edwards; Moore & Van Allen PLLC

(57) ABSTRACT

Embodiments are directed to automatically unlocking a user device based on proximity to a previously paired accessory. Embodiments include transmitting, by a transmitter of the first device (204), an ultrasound message comprising a personal code exchanged between the first device (204) and a second device (206) in a previous pairing between the first device (204) and the second device (206); receiving, by a receiver of the second device (206), the ultrasound message; determining and initiating storing, by a processor (238) of the second device (206), a timestamp associated with a time the ultrasound message was received by the second device (206); determining, by the processor (238) of the second device (206), the personal code; authenticating, by the processor (238) of the second device (206), the personal code determined from the ultrasound message; and based at least in part on the timestamp, initiating unlocking, by the (Continued)

processor (238) of the second device (206), at least one of the first device (204) or the second device (206).

10 Claims, 7 Drawing Sheets

(51) Int. Cl.
*H04L 29/06* (2006.01)
*G06F 21/35* (2013.01)
*H04B 11/00* (2006.01)

(52) U.S. Cl.
CPC ............ *H04L 63/08* (2013.01); *H04L 63/083* (2013.01); *H04L 63/0853* (2013.01); *H04L 63/107* (2013.01); *G06F 2221/2111* (2013.01)

(56) References Cited

U.S. PATENT DOCUMENTS

| | | | |
|---|---|---|---|
| 9,769,160 B2* | 9/2017 | Park | H04L 63/0853 |
| 2007/0277230 A1 | 11/2007 | Hawkins et al. | |
| 2010/0227549 A1* | 9/2010 | Kozlay | H04L 9/0662 |
| | | | 455/26.1 |
| 2010/0263031 A1* | 10/2010 | Tsuchiya | G06F 21/32 |
| | | | 726/7 |
| 2011/0126009 A1* | 5/2011 | Camp, Jr. | H04L 9/0825 |
| | | | 713/168 |
| 2011/0214158 A1* | 9/2011 | Pasquero | G06F 21/35 |
| | | | 726/2 |
| 2012/0266221 A1* | 10/2012 | Castelluccia | H04L 9/3271 |
| | | | 726/6 |
| 2013/0137452 A1* | 5/2013 | Bevan | G01S 5/021 |
| | | | 455/456.1 |
| 2013/0203345 A1 | 8/2013 | Fisher | |
| 2014/0068751 A1 | 3/2014 | Last | |
| 2014/0256260 A1* | 9/2014 | Ueda | H04W 76/023 |
| | | | 455/41.2 |
| 2015/0005630 A1* | 1/2015 | Jung | A61B 8/565 |
| | | | 600/437 |
| 2015/0186092 A1* | 7/2015 | Francis | G06F 3/1423 |
| | | | 345/520 |
| 2016/0080936 A1* | 3/2016 | Rachuri | H04W 12/06 |
| | | | 726/7 |
| 2017/0071017 A1* | 3/2017 | Klemans | H04W 76/023 |

OTHER PUBLICATIONS

Findling, Rainhard Dieter, and Rene Mayrhofer. "Towards device-to-user authentication: protecting against phishing hardware by ensuring mobile device authenticity using vibration patterns." Proceedings of the 14th International Conference on Mobile and Ubiquitous Multimedia. ACM, 2015. pp. 131-135.*

S. Capkun and J. P. Hubaux, "Secure positioning of wireless devices with application to sensor networks," Proceedings IEEE 24th Annual Joint Conference of the IEEE Computer and Communications Societies., 2005, pp. 1917-1928 vol. 3.*

International Search Report and Written Opinion; dated Feb. 25, 2015; issued in International Patent Application No. PCT/EP2014/075121.

International Preliminary Report on Patentability; dated Oct. 13, 2016; issued in International Patent Application No. PCT/EP2014/075121.

* cited by examiner

AUTHENTICATION WITH ULTRASOUND

CROSS-REFERENCE TO RELATED APPLICATION

This application claims priority to U.S. Provisional Patent Application No. 61/973,299, filed Apr. 1, 2014, and titled "Authentication With Ultrasound," the entire disclosure of which is hereby incorporated by reference.

BACKGROUND

Typically in order to unlock a mobile communication device or other handheld device, a user must authenticate his or her identity. Types of authentication may include entering a passcode, performing an action such as tapping and/or swiping the screen of the device in a predefined pattern. These authentication methods may be time consuming when a user need access to the device, and may, in some instances, perform inconsistently, especially given the potential for human error when providing the authentication information.

BRIEF SUMMARY

Embodiments of the invention are directed to systems, methods and computer program products for automatically unlocking a user device based on proximity to a previously paired accessory. Embodiments of the method include transmitting, by a transmitter of the first device, an ultrasound message comprising a personal code exchanged between the first device and a second device in a previous pairing between the first device and the second device; receiving, by a receiver of the second device, the ultrasound message; determining and initiating storing, by a processor of the second device, a timestamp associated with a time (Tc) the ultrasound message was received by the second device; determining, by the processor of the second device, the personal code; authenticating, by the processor of the second device, the personal code determined from the ultrasound message; and in response to authenticating the personal code, and based at least in part on the timestamp, initiating unlocking, by the processor of the second device, at least one of the first device or the second device.

In some embodiments, the first device is a mobile communication device and the second device is a wearable mobile communication device accessory and wherein unlocking comprises unlocking the mobile communication device.

In some embodiments, the personal code comprises a pseudo-random sequence.

In some embodiments, initiating unlocking comprises transmitting, by a transmitter of the second device, a response message comprising a delta time representing an amount of time elapsed between the timestamp and transmission of the response message; and the method further comprises receiving, by a receiver of the first device, the response message; calculating, by a processor of the first device, an ultrasound message propagation time by subtracting the delta time from a total time elapsed since transmission of the ultrasound message by the transmitter of the first device; determining, by the processor of the first device, that the first device should be unlocked based at least in part on the calculated ultrasound message propagation time; and unlocking, by the processor of the first device, the first device.

In some such embodiments, determining that the first device should be unlocked comprises comparing the calculated ultrasound message propagation time to a predetermined time threshold; and based on the comparison, determining that the calculated ultrasound message propagation time is less than the predetermined threshold. In other such embodiments, determining that the first device should be unlocked comprises calculating a distance by multiplying the ultrasound message propagation time by a constant representing the speed of sound; comparing the calculated distance to a predetermined distance threshold; and based on the comparison, determining that the calculated distance is less than the predetermined threshold. In other such embodiments, determining the timestamp comprises reading an internal clock of the second device proximate a physical layer of the ultrasound message for reducing timing uncertainty.

In yet other such embodiments, determining the timestamp comprises reading an internal clock of the second device at a layer of the ultrasound message having a known time delay to a physical layer of the ultrasound message for reducing timing uncertainty. In other such embodiments, an absolute time of the first device and the second device are substantially synchronized; and receiving the ultrasound message comprises initiating listening, by the processor of the second device, for ultrasound messages during predetermined time slots. In other such embodiments, receiving the ultrasound message comprises receiving at least one previous ultrasound message; determining a transmission timing pattern based on the received at least one previous ultrasound message; determining, based on the determined transmission timing pattern, at least one time slot likely to contain the ultrasound message; and initiating listening, by the processor of the second device, for ultrasound message during the determined at least one time slot.

In some embodiments, the first device is an accessory and the second device is a mobile communication device; an absolute time of the first device and the second device are substantially synchronized; and the method further comprises determining and initiating storing, by a processor of the first device, a second timestamp associated with a time the ultrasound message is being transmitted by the first device; where the ultrasound message further comprises the second timestamp; where initiating unlocking comprises calculating, by the processor of the second device, an ultrasound message propagation time by subtracting the timestamp from the second timestamp; determining, by the processor of the second device, that the second device should be unlocked based at least in part on the calculated ultrasound message propagation time; and the method further comprises unlocking, by the processor of the second device, the second device.

In some embodiments, the first device is a mobile communication device and the second device is an accessory; an absolute time of the first device and the second device are substantially synchronized; and the method further comprises determining and initiating storing, by a processor of the first device, a second timestamp associated with a time the ultrasound message is being transmitted by the first device; where the ultrasound message further comprises the second timestamp; where initiating unlocking comprises calculating, by the processor of the second device, an ultrasound message propagation time by subtracting the timestamp from the second timestamp; determining, by the processor of the second device, that the first device should be unlocked based at least in part on the calculated ultrasound message propagation time; and the method further comprises initiating, by the processor of the second device, a traditional communication channel with the first device;

transmitting, by the second device to the first device, a request message including a request for the first device to unlock; and in response to receiving the transmission from the second device, unlocking, by the processor of the first device, the first device.

In some embodiments, the method also includes detecting, by a microphone of the first device, the ultrasound message transmitted by the transmitter of the first device; determining, by the processor of the first device, a time (Tb) that the ultrasound message was detected by the microphone of the first device; where initiating unlocking comprises transmitting, by a transmitter of the second device, an ultrasonic response message; detecting, by the receiver of the second device, the ultrasonic response message; determining, by the processor of the second device, a time (Te) that the ultrasound response message was detected by the microphone of the second device; detecting, by a receiver of the first device, the response message; determining, by the processor of the first device, a time (Tf) that the ultrasound response message was received by the receiver of the first device; calculating, by the processor of the first device, an ultrasound message propagation time based at least in part on Tb, Tc, Te and Tf; determining, by the processor of the first device, that the first device should be unlocked based at least in part on the calculated ultrasound propagation time; and the method further comprises unlocking, by the processor of the first device, the first device.

In some such embodiments, calculating the ultrasound message propagation time comprises calculating ((Tf−Tb)−(Te−Tc))/2.

In some embodiments, determining that the first device should be unlocked comprises comparing the calculated ultrasound message propagation time to a predetermined time threshold; and based on the comparison, determining that the calculated ultrasound message propagation time is less than the predetermined threshold.

In some embodiments, determining that the first device should be unlocked comprises calculating a distance by multiplying the ultrasound message propagation time by a constant representing the speed of sound; comparing the calculated distance to a predetermined distance threshold; and based on the comparison, determining that the calculated distance is less than the predetermined threshold.

According to embodiments of the invention, a system for automatically unlocking a user device based on proximity to a previously paired accessory includes a mobile communication device having a memory, a processor and a module stored in the memory, executable by the processor, and configured to initiate transmission, by a transmitter of the mobile communication device, an ultrasound message comprising a personal code exchanged between the mobile communication device and a mobile communication device accessory in a previous pairing between the mobile communication device and the mobile communication device accessory. The system also includes a mobile communication device accessory having a memory, a processor and a module stored in the memory, executable by the processor and configured to receive the ultrasound message; determine and initiate storing a timestamp associated with a time the ultrasound message was received by the mobile communication device accessory; determine the personal code; authenticate the personal code determined from the ultrasound message; and in response to authenticating the personal code, and based at least in part on the timestamp, initiating unlocking the mobile communication device.

In some embodiments, initiating unlocking comprises initiating transmission of a response message comprising a delta time representing an amount of time elapsed between the timestamp and transmission of the response message; where the mobile communication device module is further configured to receive the response message; calculate an ultrasound message propagation time by subtracting the delta time from a total time elapsed since transmission of the ultrasound message by the transmitter of the first device; determine that the first device should be unlocked based at least in part on the calculated ultrasound message propagation time; and unlock the first device.

According to embodiments of the invention, a computer program product includes a non-transitory computer-readable medium comprising a set of codes for causing a computer to receive, by a second device, an ultrasound message transmitted by a first device, the ultrasound message comprising a personal code exchanged between the first device and a second device in a previous pairing between the first device and the second device; determine and initiate storing, by the second device, a timestamp associated with a time (Tc) the ultrasound message was received by the second device; determine, by the second device, the personal code; authenticate, by the second device, the personal code determined from the ultrasound message; and in response to authenticating the personal code, and based at least in part on the timestamp, initiating unlocking, by the second device, at least one of the first device or the second device.

In some embodiments, initiating unlocking comprises initiating transmission of a response message comprising a delta time representing an amount of time elapsed between the timestamp and transmission of the response message; whereby the first device receives the response message; calculates an ultrasound message propagation time by subtracting the delta time from a total time elapsed since transmission of the ultrasound message by the transmitter of the first device; determines that the first device should be unlocked based at least in part on the calculated ultrasound message propagation time; and unlocks the first device.

BRIEF DESCRIPTION OF THE DRAWINGS

Figure 1:
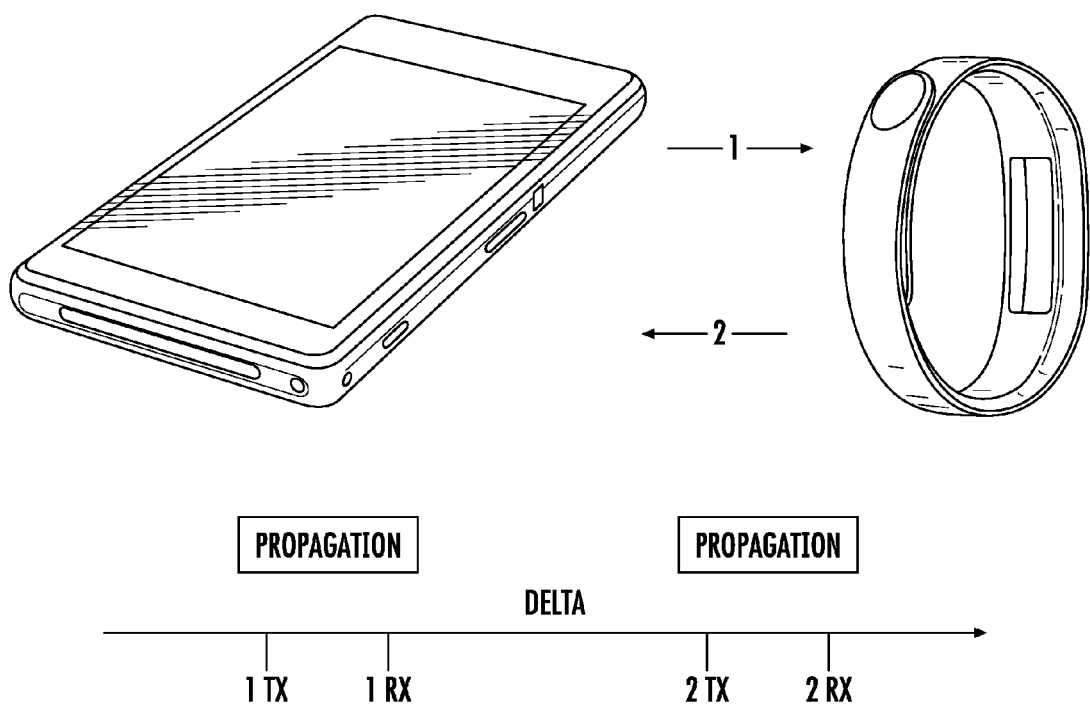
Figure 2:
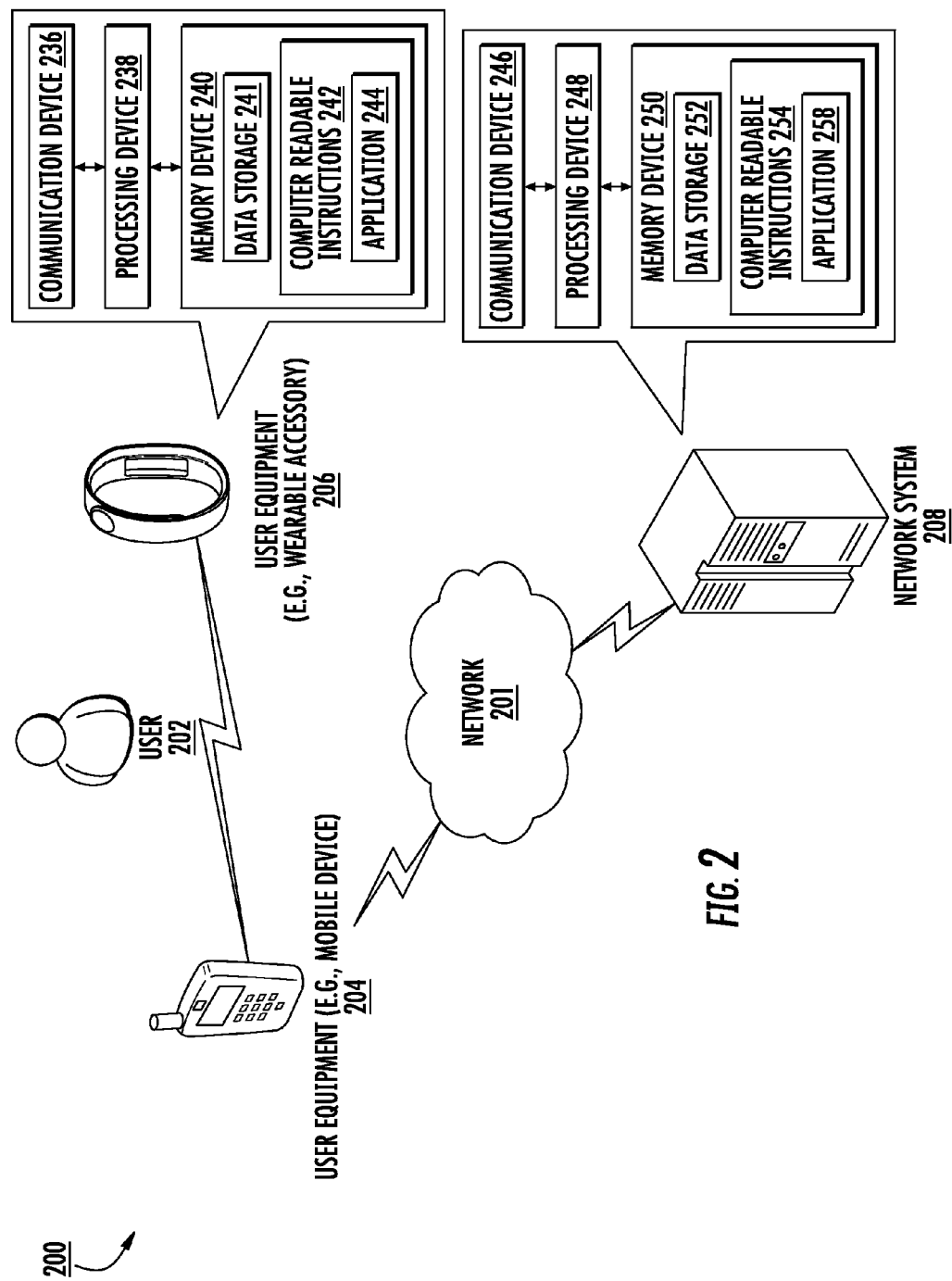
Figure 3:
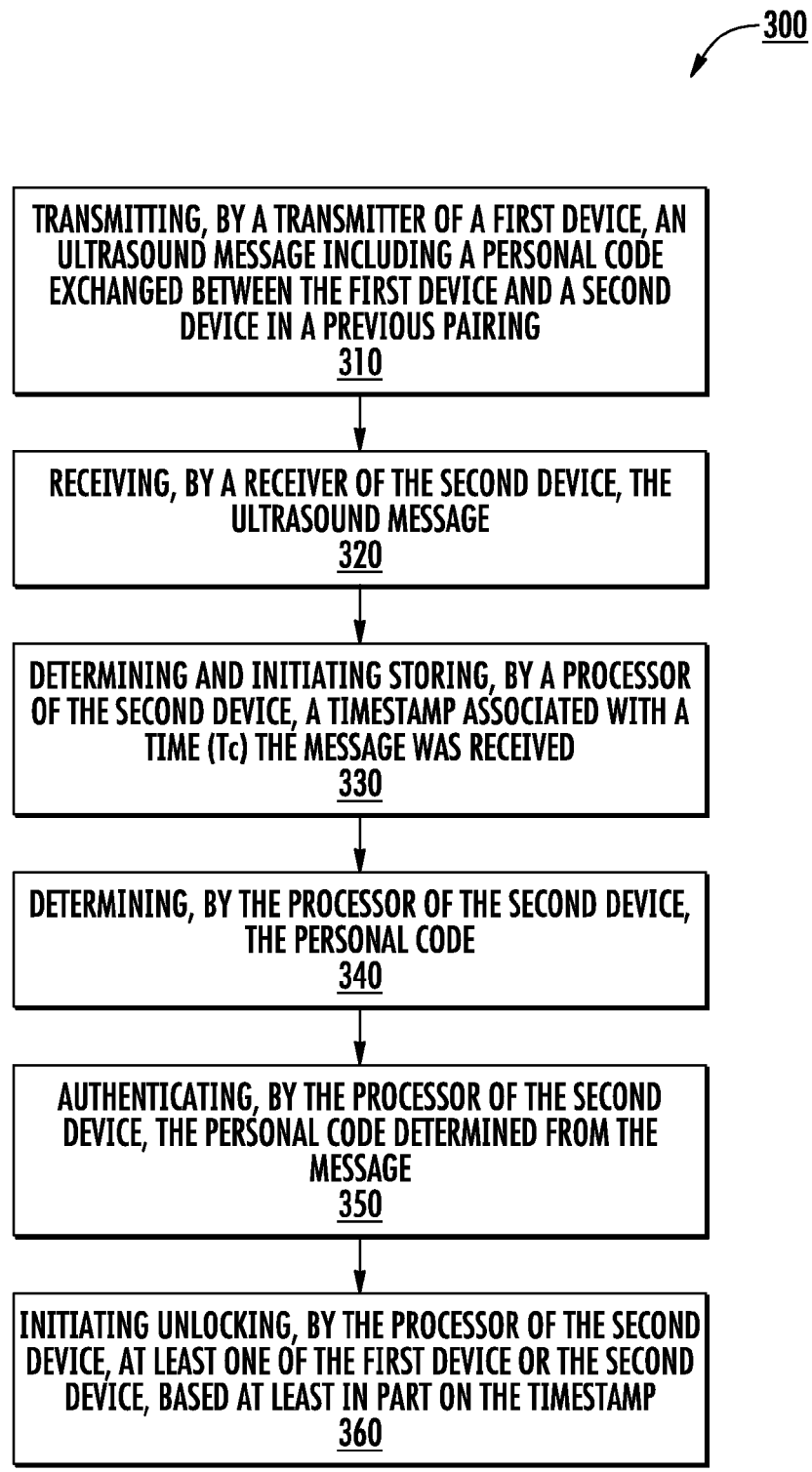
Figure 4:
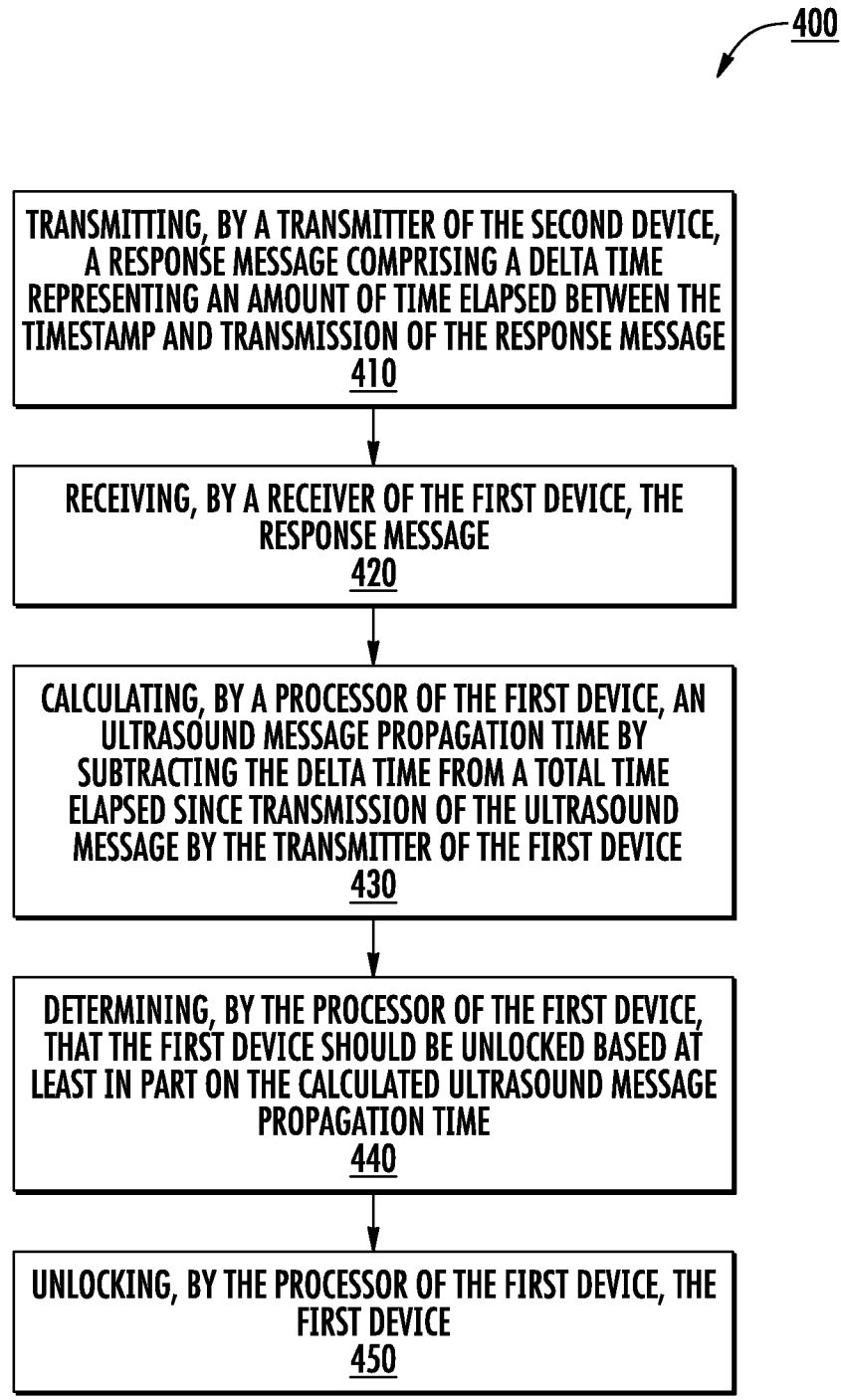
Figure 5:
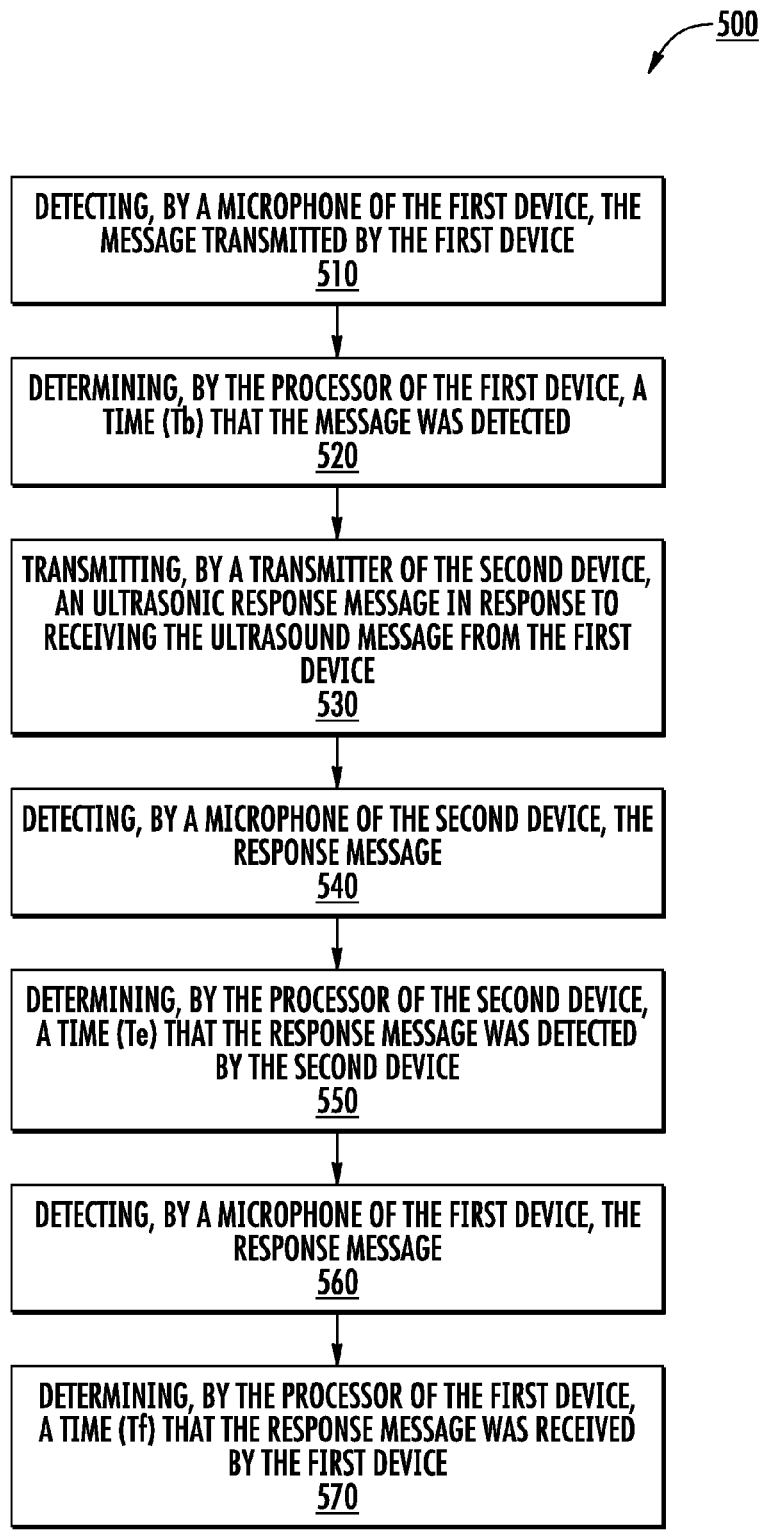
Figure 6:
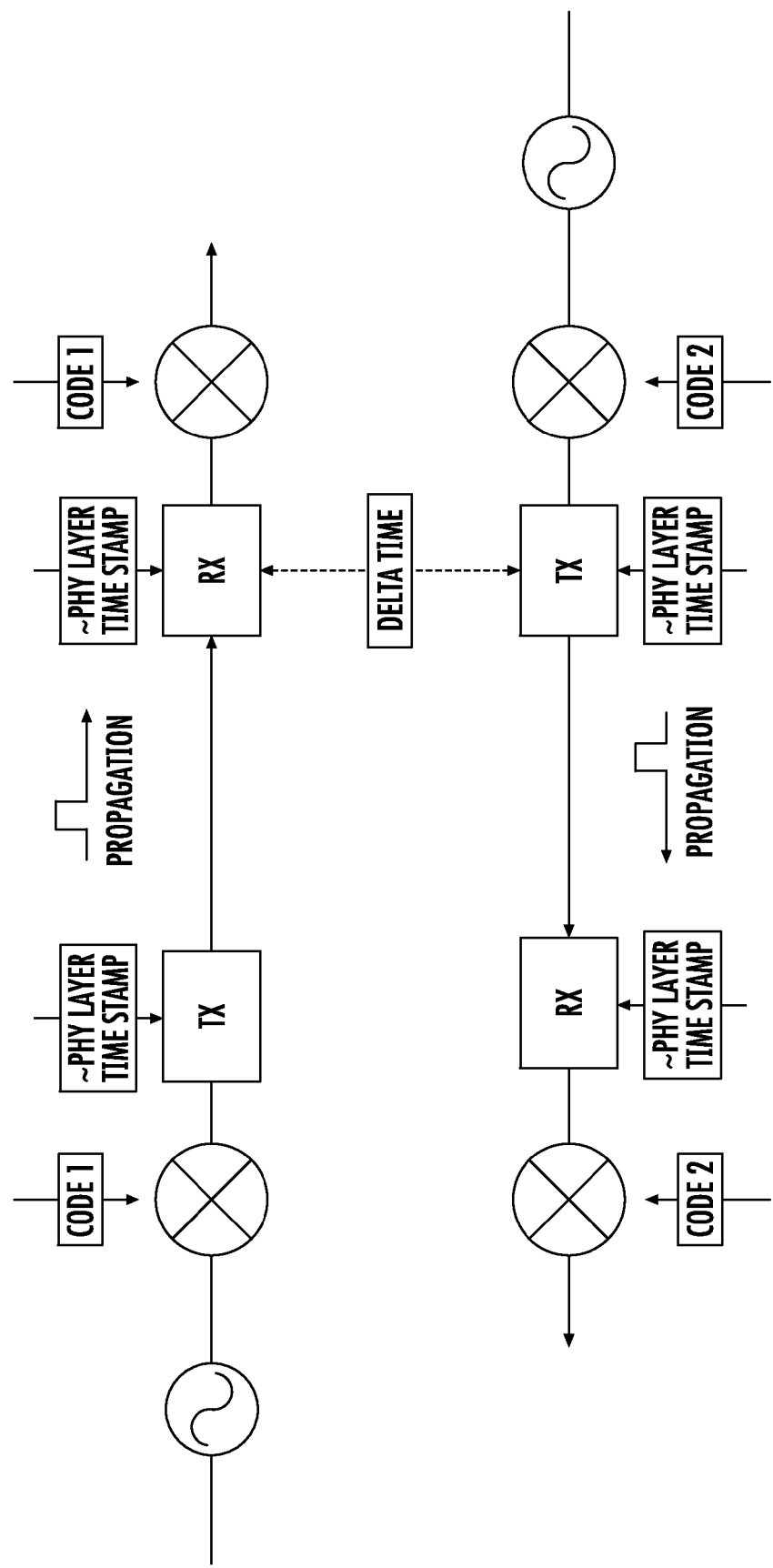
Figure 7:
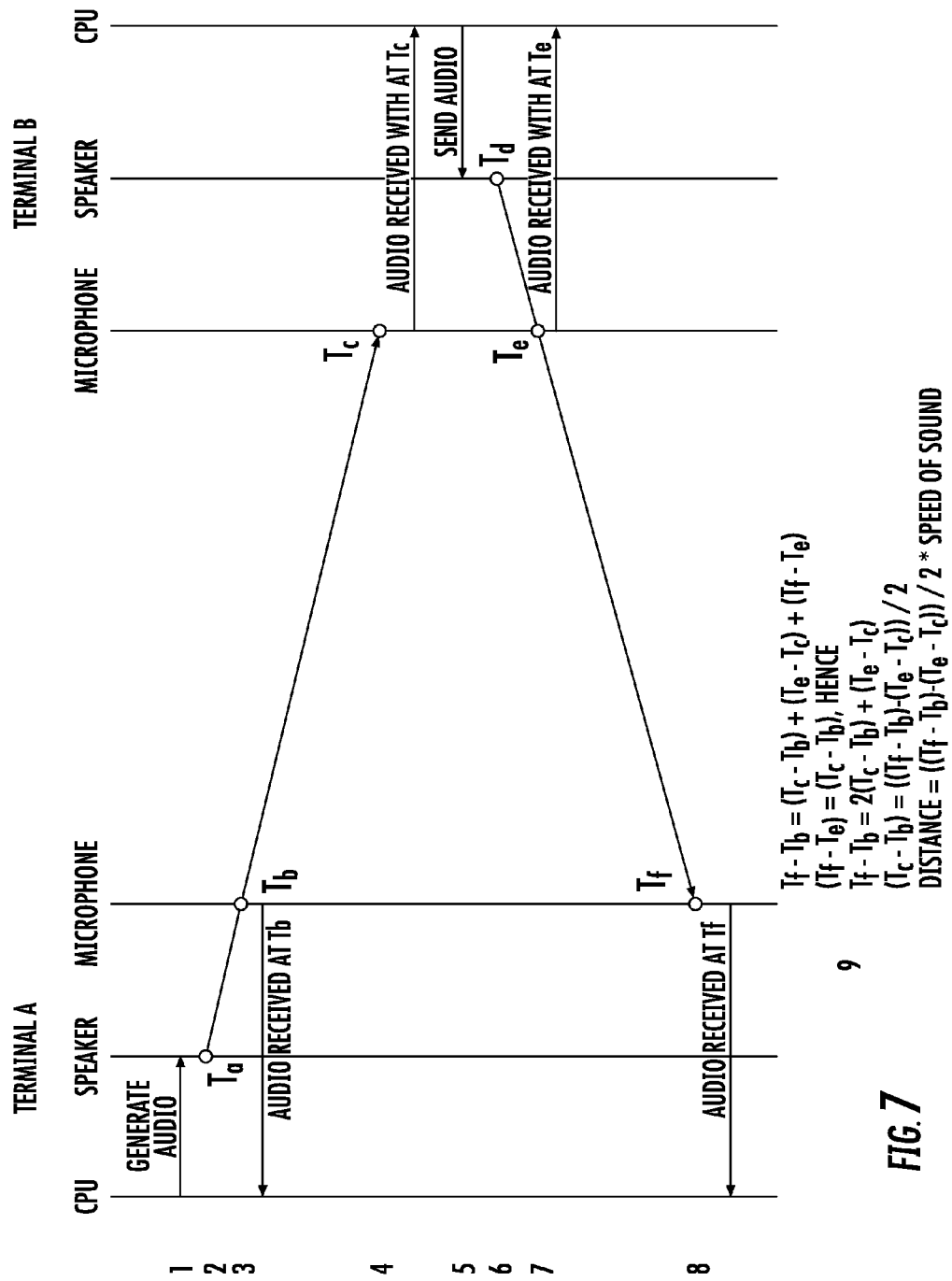

Having thus described embodiments of the invention in general terms, reference will now be made to the accompanying drawings, where:

FIG. 1 is a diagram illustrating communication between a user device and an accessory according to embodiments of the invention;

FIG. 2 is a network environment 200 illustrated in accordance with embodiments of the invention;

FIG. 3 illustrates a flowchart of a method 300 for automatically unlocking a user device based on proximity to a previously paired accessory according to embodiments of the invention;

FIG. 4 illustrates a flowchart of a method 400 for automatically unlocking a user device based on proximity to a previously paired accessory according to embodiments of the invention;

FIG. 5 illustrates a flowchart of a method 500 for automatically unlocking a user device based on proximity to a previously paired accessory according to embodiments of the invention;

FIG. 6 is a diagram illustrating propagation of the ultrasonic messages according to embodiments of the invention; and FIG. 7 is a diagram illustrating propagation of the ultrasonic messages according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be locked in order to prevent usage by an unauthorized person or to avoid accidental user interface input, such as accidental touchscreen input occurring while the device is in a user's pocket. Embodiments of the invention are directed to automatically unlocking a user device based on proximity to a previously paired accessory. Embodiments include transmitting, by a transmitter of the first device, an ultrasound message comprising a personal code exchanged between the first device and a second device in a previous pairing between the first device and the second device; receiving, by a receiver of the second device, the ultrasound message; determining and initiating storing, by a processor of the second device, a timestamp associated with a time the ultrasound message was received by the second device; determining, by the processor of the second device, the personal code; authenticating, by the processor of the second device, the personal code determined from the ultrasound message; and based at least in part on the timestamp, initiating unlocking, by the processor of the second device, at least one of the first device or the second device. In some cases, embodiments of the invention include a simple device unlocking mechanism such as a user's swipe of a touchscreen and the proximity unlocking features discussed herein limit the need for more complex user interface interaction such as entry of a PIN code or otherwise.

Referring now to FIG. 1, a diagram illustrates a diagram illustrating communication between a user device and an accessory according to embodiments of the invention;

Referring now to FIG. 2, a network environment 200 is illustrated in accordance with one embodiment of the present invention. As illustrated in FIG. 2, the network system 208 is operatively coupled, via a network 201 to the user equipment 204 and/or 206. In this configuration, the network system 208 may send information to and receive information from the user equipment devices 204 and/or 206. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201. In some embodiments, the user 202 is an individual who maintains cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258.

As illustrated in FIG. 2, the user equipment 206 (e.g., wearable accessory) generally comprises a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally comprises a modem, server, or other device for communicating with other devices on the network 201.

As further illustrated in FIG. 2, the user equipment 206 comprises computer-readable instructions 242 stored in the memory device 240, which in one embodiment includes the computer-readable instructions 242 of an application 244. In the embodiment illustrated in FIG. 2, the application 244 allows the user equipment 206 to be linked to the network system 208 to communicate, via a network 201. The application 244 may also allow the user equipment 206 to connect directly (i.e., locally or device to device) with the user equipment 204. User equipment 204 (e.g., a mobile communication device) may include one or more components similar to those described with reference to user equipment 206.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 3, a flowchart illustrates a method 300 for automatically unlocking a user device based on proximity to a previously paired accessory The first step of method 300, as represented by block 310, is transmitting, by a transmitter of a first device, an ultrasound message comprising a personal code exchanged between the first device and a second device in a previous pairing between the devices.

The next step, represented by block 320, is receiving, by a receiver (e.g., a microphone) of the second device, the ultrasound message. The next steps, as represented by block 330, are determining and initiating storing, by a processor of the second device, a timestamp associated with a time (Tc)

the ultrasound message was received by the second device. Then, as represented by block 340, the method determines, by the processor of the second device, the personal code and authenticates, by the processor of the second device, the personal code determined from the ultrasound message, as represented by block 350. In response to authenticating the personal code, and based at least in part on the timestamp, the final step of method 300 is initiating unlocking, by the processor of the second device, at least one of the first device or the second device, as represented by block 360.

In some embodiments, the first device is a mobile communication device and the second device is a wearable (or non-wearable in some cases) mobile communication device accessory and unlocking comprises unlocking the mobile communication device. In various other embodiments, the first device is a wearable (or non-wearable in some cases) mobile communication device accessory the second device is a mobile communication device and unlocking comprises unlocking the mobile communication device. In some embodiments, the personal code comprises a pseudo-random sequence, and in other embodiments, the personal code is some other code known by both the first and second devices.

Referring now to FIG. 4, a flowchart illustrates a method 400 for automatically unlocking a user device based on proximity to a previously paired accessory according to embodiments of the invention. In some embodiments, initiating unlocking comprises transmitting, by a transmitter of the second device, a response message comprising a delta time representing an amount of time elapsed between the timestamp and transmission of the response message, as represented by block 410. Next, as represented by block 420, the method includes receiving, by a receiver of the first device, the response message. Next, the method includes calculating, by a processor of the first device, an ultrasound message propagation time by subtracting the delta time from a total time elapsed since transmission of the ultrasound message by the transmitter of the first device, as represented by block 430. Then, the method determines, by the processor of the first device, that the first device should be unlocked based at least in part on the calculated ultrasound message propagation time, as represented by block 440. Finally, the method includes unlocking, by the processor of the first device, the first device, as represented by block 450.

In some such embodiments, determining that the first device should be unlocked comprises comparing the calculated ultrasound message propagation time to a predetermined time threshold; and based on the comparison, determining that the calculated ultrasound message propagation time is less than the predetermined threshold. In other such embodiments, determining that the first device should be unlocked comprises calculating a distance by multiplying the ultrasound message propagation time by a constant representing the speed of sound; comparing the calculated distance to a predetermined distance threshold; and based on the comparison, determining that the calculated distance is less than the predetermined threshold. In other such embodiments, determining the timestamp comprises reading an internal clock of the second device proximate a physical layer of the ultrasound message for reducing timing uncertainty.

In some other embodiments, determining the timestamp comprises reading an internal clock of the second device at a layer of the ultrasound message having a known time delay to a physical layer of the ultrasound message for reducing timing uncertainty. In other such embodiments, an absolute time of the first device and the second device are substantially synchronized; and receiving the ultrasound message comprises initiating listening, by the processor of the second device, for ultrasound messages during predetermined time slots. In other such embodiments, receiving the ultrasound message comprises receiving at least one previous ultrasound message; determining a transmission timing pattern based on the received at least one previous ultrasound message; determining, based on the determined transmission timing pattern, at least one time slot likely to contain the ultrasound message; and initiating listening, by the processor of the second device, for ultrasound message during the determined at least one time slot.

In some embodiments, the first device is an accessory and the second device is a mobile communication device; an absolute time of the first device and the second device are substantially synchronized; and the method further comprises determining and initiating storing, by a processor of the first device, a second timestamp associated with a time the ultrasound message is being transmitted by the first device; where the ultrasound message further comprises the second timestamp; where initiating unlocking comprises calculating, by the processor of the second device, an ultrasound message propagation time by subtracting the timestamp from the second timestamp; determining, by the processor of the second device, that the second device should be unlocked based at least in part on the calculated ultrasound message propagation time; and the method further comprises unlocking, by the processor of the second device, the second device.

In some embodiments, the first device is a mobile communication device and the second device is an accessory; an absolute time of the first device and the second device are substantially synchronized; and the method further comprises determining and initiating storing, by a processor of the first device, a second timestamp associated with a time the ultrasound message is being transmitted by the first device; where the ultrasound message further comprises the second timestamp; where initiating unlocking comprises calculating, by the processor of the second device, an ultrasound message propagation time by subtracting the timestamp from the second timestamp; determining, by the processor of the second device, that the first device should be unlocked based at least in part on the calculated ultrasound message propagation time; and the method further comprises initiating, by the processor of the second device, a traditional communication channel with the first device; transmitting, by the second device to the first device, a request message including a request for the first device to unlock; and in response to receiving the transmission from the second device, unlocking, by the processor of the first device, the first device.

In some embodiments where the absolute time of the first device and second device are synchronized, the invention consists of, in its simplest form (or includes in more complex forms) determining whether a correct message has been received by one of the devices within a specified time slot. In the case where no correct message has been received, it is determined that the signal is either too weak or outside the specified time slot (e.g., it is late). In either of these cases, the receiving device should remain locked as the distance between the first and second devices is too large. Calculating the time of a correctly received message is not necessarily required, but rather, the receiving device need only determine whether the correct message was received within the specified time slot. The transmitting device does not necessarily transmit a timestamp indicating the time at which the ultrasound message is sent. Rather, the transmitting device and the receiving device may be synchronized and the transmitting device may, at a predetermined time such as at the beginning of each second, transmit the ultrasound message. If the receiving device receives a correct ultrasound message (i.e., one recognized by the receiving device or including a previously exchanged code) within a predetermined time period, such as the window from the beginning of a second through six (6) milliseconds after the beginning of the second, then the receiving device may unlock.

Referring now to FIG. 5, a flowchart illustrates a method 400 for automatically unlocking a user device based on proximity to a previously paired accessory according to embodiments of the invention. The first step, represented by block 510, is detecting, by a microphone of the first device, the ultrasound message transmitted by the transmitter of the first device. Then, represented by block 520, is determining, by the processor of the first device, a time (Tb) that the ultrasound message was detected by the microphone of the first device, where initiating unlocking comprises transmitting, by a transmitter of the second device, an ultrasonic response message, as represented by block 530. Next, represented by block 540, the method detects, by the receiver of the second device, the ultrasonic response message. Then, the method determines, by the processor of the second device, a time (Te) that the ultrasound response message was detected by the microphone of the second device, as represented by block 550. Next, the method detects, as represented by block 560, by a receiver of the first device, the response message. Then, the method determines, by the processor of the first device, a time (Tf) that the ultrasound response message was received by the receiver of the first device, as represented by block 570 and calculates, by the processor of the first device, an ultrasound message propagation time based at least in part on Tb, Tc, Te and Tf. In some embodiments, the method then determines, by the processor of the first device, that the first device should be unlocked based at least in part on the calculated ultrasound propagation time and unlocks, by the processor of the first device, the first device.

In some such embodiments, calculating the ultrasound message propagation time comprises calculating $((Tf-Tb)-(Te-Tc))/2$. In some embodiments, determining that the first device should be unlocked comprises comparing the calculated ultrasound message propagation time to a predetermined time threshold; and based on the comparison, determining that the calculated ultrasound message propagation time is less than the predetermined threshold. In some embodiments, determining that the first device should be unlocked comprises calculating a distance by multiplying the ultrasound message propagation time by a constant representing the speed of sound; comparing the calculated distance to a predetermined distance threshold; and based on the comparison, determining that the calculated distance is less than the predetermined threshold.

Referring now to FIG. 6, a diagram illustrates propagation of the ultrasound messages according to embodiments of the invention. The example of FIG. 6 is a code-division multiple access (CDMA) system. Payload information may be communicated by such a system, but "Code 1" and "Code 2" merely enable transmitting and receiving devices to communicate. This CDMA system could utilize encryption techniques in conjunction with the ultrasound propagation embodiments described herein in order to measure distance and unlock devices.

Referring now to FIG. 7, a diagram illustrates times Ta, Tb, Tc, Td, Te, and Tf and propagation of the ultrasound message from Terminal A (i.e., the first device) to Terminal B (i.e., the second device) and propagation of the response message from Terminal B to Terminal A.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for automatically unlocking a user device based on proximity to a previously paired accessory, the method comprising:
   transmitting, by a transmitter of a first device, an ultrasound message comprising a personal code exchanged between the first device and a second device in a previous pairing between the first device and the second device;
   receiving, by a receiver of the second device, the ultrasound message;
   determining and initiating storing, by a processor of the second device, a timestamp associated with a time (Tc) the ultrasound message was received by the second device;
   determining, by the processor of the second device, the personal code;
   authenticating, by the processor of the second device, the personal code determined from the ultrasound message; and
   in response to authenticating the personal code, transmitting, by a transmitter of the second device, an ultrasound response message comprising a delta time representing an amount of time elapsed between time (Tc) of the timestamp and a time of transmission of the ultrasound response message;
   receiving, by a receiver of the first device, the response message;
   calculating, by a processor of the first device, an ultrasound message propagation time by subtracting the delta time from a total time elapsed since transmission of the ultrasound message by the transmitter of the first device;
   determining, by the processor of the first device, that the first device is to be unlocked by (i) calculating a distance by multiplying the ultrasound message propagation time by a constant representing a speed of sound; (ii) comparing the calculated distance to a predetermined distance threshold; and (iii) based on the comparison, determining that the calculated distance is less than the predetermined threshold; and
   in response to determining that the calculated distance is less than the predetermined threshold, unlocking, by the processor of the first device, the first device.

2. The method of claim 1, wherein the first device is a mobile communication device and the second device is a wearable mobile communication device accessory and wherein unlocking comprises unlocking the mobile communication device.

3. The method of claim 1, wherein the personal code comprises a pseudo-random sequence.

4. The method of claim 1, wherein determining the timestamp comprises reading an internal clock of the second device proximate a physical layer of the ultrasound message for reducing timing uncertainty.

5. The method of claim 1, wherein determining the timestamp comprises reading an internal clock of the second device at a layer of the ultrasound message having a known time delay to a physical layer of the ultrasound message for reducing timing uncertainty.

6. The method of claim 1,
   wherein an absolute time of the first device and the second device are synchronized; and wherein receiving the ultrasound message comprises initiating listening, by the processor of the second device, for ultrasound messages during predetermined time slots.

7. The method of claim 1, wherein receiving the ultrasound message comprises:
   receiving at least one previous ultrasound message;
   determining a transmission timing pattern based on the received at least one previous ultrasound message;
   determining, based on the determined transmission timing pattern, at least one time slot expected to include the ultrasound message; and
   initiating listening, by the processor of the second device, for ultrasound message during the determined at least one time slot.

8. The method of claim 1,
   wherein the first device is an accessory and the second device is a mobile communication device;
   wherein an absolute time of the first device and the second device are synchronized; the method further comprising:
   determining and initiating storing, by a processor of the first device, a second timestamp associated with a time the ultrasound message is being transmitted by the first device;
   wherein the ultrasound message further comprises the second timestamp;
   wherein initiating unlocking comprises:
      calculating, by the processor of the second device, an ultrasound message propagation time by subtracting the timestamp from the second timestamp;
      determining, by the processor of the second device, that the second device is to be unlocked based on the calculated ultrasound message propagation time; and
      the method further comprising:
   unlocking, by the processor of the second device, the second device.

9. A system for automatically unlocking a user device based on proximity to a previously paired accessory, the system comprising:
   a mobile communication device having a memory, a processor and a module stored in the memory, executable by the processor, and configured to:
      initiate transmission, by a transmitter of the mobile communication device, an ultrasound message comprising a personal code exchanged between the mobile communication device and a mobile communication device accessory in a previous pairing between the mobile communication device and the mobile communication device accessory;
   the mobile communication device accessory having a memory, a processor and a module stored in the memory, executable by the processor and configured to:
      receive the ultrasound message;
      determine and initiate storing a timestamp associated with a time the ultrasound message was received by the mobile communication device accessory;
      determine the personal code;
      authenticate the personal code determined from the ultrasound message; and
      in response to authenticating the personal code, and based on the timestamp, initiating unlocking the mobile communication device by transmitting an ultrasound response message comprising a delta time representing an amount of time elapsed between time (Tc) of the timestamp and a time of transmission of the ultrasound response message,
   wherein the module of the mobile communication device is further configured to:
      receive the response message;
      calculate an ultrasound message propagation time by subtracting the delta time from a total time elapsed since transmission of the ultrasound message by the transmitter of the first device;
      determine that the first device is to be unlocked by (i) calculating a distance by multiplying the ultrasound message propagation time by a constant representing a speed of sound; (ii) comparing the calculated distance to a predetermined distance threshold; and (iii) based on the comparison, determining that the calculated distance is less than the predetermined threshold; and
      in response to determining that the calculated distance is less than the predetermined threshold, unlock the first device.

10. A computer program product for automatically unlocking a first device based on proximity to a previously paired second device, the computer program product comprising:
   a non-transitory computer-readable medium comprising a set of codes for causing the first and second devices to:
      receive, by a second device, an ultrasound message transmitted by a first device, the ultrasound message comprising a personal code exchanged between the first device and a second device in a previous pairing between the first device and the second device;
      determine and initiate storing, by the second device, a timestamp associated with a time (Tc) the ultrasound message was received by the second device;
      determine, by the second device, the personal code;
      authenticate, by the second device, the personal code determined from the ultrasound message; and
      in response to authenticating the personal code, transmitting, by the second device, an ultrasound response message comprising a delta time representing an amount of time elapsed between time (Tc) of the timestamp and a time of transmission of the ultrasound response message,
   wherein in response to the first device receiving the response message, the first device (i) calculates an ultrasound message propagation time by subtracting the delta time from a total time elapsed since transmission of the ultrasound message by the transmitter of the first device, (ii) determining, by the first device, that the first device is to be unlocked by (a) calculating a distance by multiplying the ultrasound message propagation time by a constant representing a speed of sound; (b) comparing the calculated distance to a predetermined distance threshold; and (c) based on the comparison, determining that the calculated distance is less than the predetermined threshold; and (iii) unlocks the first device.

* * * * *